United States Patent
Kras

(10) Patent No.: US 12,174,966 B2
(45) Date of Patent: Dec. 24, 2024

(54) SYSTEMS AND METHODS FOR MITIGATING FALSE POSITIVES IN A SIMULATED PHISHING CAMPAIGN

(71) Applicant: KnowBe4, Inc., Clearwater, FL (US)

(72) Inventor: Greg Kras, Dunedin, FL (US)

(73) Assignee: KnowBe4, Inc., Clearwater, FL (US)

( * ) Notice: Subject to any disclaimer, the term of this patent is extended or adjusted under 35 U.S.C. 154(b) by 480 days.

(21) Appl. No.: 17/539,922

(22) Filed: Dec. 1, 2021

(65) Prior Publication Data

US 2022/0171860 A1 Jun. 2, 2022

Related U.S. Application Data

(60) Provisional application No. 63/120,528, filed on Dec. 2, 2020.

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .. G06F 21/577; G06F 2221/034; G06F 21/57; H04L 63/1483
See application file for complete search history.

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |

(Continued)

FOREIGN PATENT DOCUMENTS

| | | |
|---|---|---|
| EP | 3 582 468 A1 | 12/2019 |
| WO | WO-2016/164844 A1 | 10/2016 |

*Primary Examiner* — Trong H Nguyen
(74) *Attorney, Agent, or Firm* — Foley & Lardner LLP

(57) ABSTRACT

Systems and methods are described for mitigating false positives in a simulated phishing campaign. A simulated phishing message reported to second security awareness system by a user as suspicious is received by first security awareness system. The reported message includes a link that has been followed. Link data of followed link of the reported message is held in click cache having predetermined delay. Post the predetermined delay, whether the link was followed by second security awareness system instead of being clicked by user responsive to identifying that link data in click cache corresponds to link data in link cache or internet protocol (IP) address of an entity that follows a link corresponds to IP address stored in IP cache known to be associated with second security awareness system. Responsive to determination, second security awareness system's following of link of the reported message is excluded as interaction of the user.

20 Claims, 12 Drawing Sheets

(56) References Cited

U.S. PATENT DOCUMENTS

| | | |
|---|---|---|
| 9,667,645 B1 | 5/2017 | Belani et al. |
| 9,876,753 B1 | 1/2018 | Hawthorn |
| 9,912,687 B1 | 3/2018 | Wescoe et al. |
| 10,243,904 B1 | 3/2019 | Wescoe et al. |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 2016/0164898 A1 | 6/2016 | Belani et al. |
| 2016/0301705 A1 | 10/2016 | Higbee et al. |
| 2019/0068616 A1* | 2/2019 | Woods .................. H04L 63/145 |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0356679 A1* | 11/2019 | Sites ................... H04L 63/1416 |
| 2020/0286015 A1* | 9/2020 | Richards ............. H04L 61/4511 |
| 2020/0311260 A1 | 10/2020 | Klonowski et al. |
| 2021/0185075 A1 | 6/2021 | Adams |
| 2021/0194924 A1 | 6/2021 | Heinemeyer et al. |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

* cited by examiner

SYSTEMS AND METHODS FOR MITIGATING FALSE POSITIVES IN A SIMULATED PHISHING CAMPAIGN

RELATED APPLICATIONS

This patent application claims the benefit of and priority to U.S. Provisional Patent Application No. 63/120,528 titled "SYSTEMS AND METHODS FOR MITIGATING FALSE POSITIVES IN A SIMULATED PHISHING CAMPAIGN," and filed Dec. 2, 2020, the contents of all of which are hereby incorporated herein by reference in its entirety for all purposes

TECHNICAL FIELD

The present disclosure relates to systems and methods for the mitigation of false positives in a simulated phishing campaign due to the interaction with a third-party threat detection system.

BACKGROUND

Among cybersecurity attacks, organizations have recognized phishing attacks as one of the most prominent threats that can cause serious breaches of data including confidential information such as intellectual property, financial information, an organization's information and other important information. Attackers who launch phishing attacks may attempt to evade an organization's security apparatuses and tools and target its employees. To prevent or to reduce the success rate of phishing attacks on employees, the organizations may conduct security awareness training programs for their employees, along with other security measures. Through security awareness training programs, the organizations actively educate their employees on how to spot and report a suspected phishing attack.

As a part of a security awareness training program, an organization may execute a simulated phishing campaign (this campaign can also be referred to as a series of simulated phishing attacks) for its employees, to test and develop cybersecurity awareness of the employees. In an example, the organization may execute the simulated phishing campaign by sending out one or more simulated phishing messages periodically or occasionally to devices of employees and observe responses of employees to such simulated phishing messages. A simulated phishing message may mimic a real phishing message and appear genuine to entice an employee to respond/interact with the simulated phishing message. The simulated phishing message may serve a purpose of training an employee to recognize phishing attacks and to gauge the security awareness of the employee based on an interaction of the employee with the simulated phishing message (for example, by clicking on a link in the simulated phishing message or opening an attachment in the simulated phishing message) for further security awareness training. If and how the employee interacts with the simulated phishing message may be logged and may impact a risk score of the employee, a team of which the employee is part of, the organization, and an industry to which the organization belong.

In some examples, employees of the organization may be provided with various reporting tools to support the employees to report suspicious messages (potentially malicious phishing messages). One such tool is an email client plug-in that may be added or provided with an email client to report suspicious messages. An email client plug-in may be provided by the same entity that provides the email client software or may be provided by a different entity. In an example, an email client plug-in is an interface local to an email client that enables email client users, i.e., recipients of messages, to select to report suspicious messages that they believe may be a threat to them or their organization. In an example, the email client may include email client plug-ins providing a User Interface (UI) element such as a button to trigger a function. Functionality of email client plug-ins that use a UI button may be triggered when an employee clicks the button. Some examples of email client plug-ins that use a button UI for reporting suspicious messages include but are not limited to, a Phish Alert Button (PAB) plug-in and a Report Message Add-in.

SUMMARY

The present disclosure generally relates to systems and methods for the mitigation of false positives in a simulated phishing campaign due to the interaction with a third-party threat detection system.

Systems and methods are provided for mitigating false positives in a simulated phishing campaign due to the interaction with a third-party threat detection system. In an example embodiment, a method is described, which includes receiving, by a first security awareness system, a simulated phishing message of a user reported to a second security awareness system as suspicious, the simulated phishing message comprising a link that has been followed, holding, by the first security awareness system, link data of the followed link of the simulated phishing message in a click cache having a predetermined delay, determining, by the first security awareness system upon expiration of the predetermined delay, that the link data in the click cache corresponds to link data in a link cache, identifying, by the first security awareness system responsive to determining the link data in the click cache corresponds to the link data in the link cache, that the link was followed by the second security awareness system instead of being clicked by the user; and excluding, by the first security awareness system, the second security awareness system's following of the link of the simulated phishing message as an interaction of the user.

In some implementations, the method includes disassociating, by the first security awareness system, from a user record of the user of the first security awareness system a click of the user for the followed link that was recorded for the second security awareness system's following of the link of the simulated phishing message.

In some implementations, the method includes, receiving, by the first security awareness system, the simulated phishing message forwarded by the second security awareness system.

In some implementations, the method includes receiving, by the first security awareness system, the simulated phishing message of the second security awareness system by one of monitoring or scanning a mailbox within the second security awareness system for simulated phishing messages.

In some implementations, the method includes storing, by the first security awareness system, click data for the simulated phishing message to the click cache.

In some implementations, the method includes updating, by the first security awareness system, link data for the simulated phishing message to the link cache, wherein the link cache stores links that have a probability of being followed by the second security awareness system.

In some implementations, the method includes resetting the age of the followed link in the link cache.

In some implementations, the method includes adding, by the first security awareness system, to an IP cache, data comprising an internet protocol (IP) address, wherein the IP cache stores IP addresses known to be associated with the second security awareness system (these IP addresses are referred to here as IP data).

In some implementations, the method includes resetting the age of the IP data in the IP cache of the entity that follows a link.

In another example implementation, a method is described, which includes receiving, by a first security awareness system, a simulated phishing message of a user reported to a second security awareness system as suspicious, the simulated phishing message comprising a link that has been followed, holding, by the first security awareness system, link data of the followed link of the simulated phishing message in a click cache having a predetermined delay, determining, by the first security awareness system upon expiration of the predetermined delay, that the link data in the click cache is not in a link cache, determining, by the first security awareness system, that the internet protocol (IP) address of a click of the followed link corresponds to an IP address stored in an IP cache of IP addresses known to be associated with the second security awareness system, identifying, by the first security awareness system, that the link was followed by the second security awareness system instead of being clicked by the user, and excluding, by the first security awareness system, the second security awareness system's following of the link of the simulated phishing message as an interaction of the user.

In some implementations, the method includes resetting age of IP data in the IP cache of an entity that follows a link.

In yet another example implementation, a system is described, which includes a first security awareness system executable on one or more processors, coupled to memory and configured to receive a simulated phishing message of a user reported to a second security awareness system as suspicious, the simulated phishing message comprising a link that has been followed, hold, link data of the followed link of the simulated phishing message in a click cache having a predetermined delay, determine, upon expiration of the predetermined delay, that the link was followed by the second security awareness system instead of being clicked by the user responsive to identifying that the link data in the click cache corresponds to link data in a link cache or an internet protocol (IP) address of a click of the followed link corresponds to an IP address stored in an IP cache of IP addresses known to be associated with the second security awareness system, and exclude, responsive to the determination, the second security awareness system's following of the link of the simulated phishing message as an interaction of the user.

In some implementations, the first security awareness system is further configured to refresh an entry of IP data and link address of the followed link in the IP cache and the link cache respectively.

Other aspects and advantages of the disclosure will become apparent from the following detailed description, taken in conjunction with the accompanying drawings, which illustrate by way of example the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for the mitigation of false positives in a simulated phishing campaign due to the interaction with a third-party threat detection system.

A. Computing and Network Environment

Figure 1A:
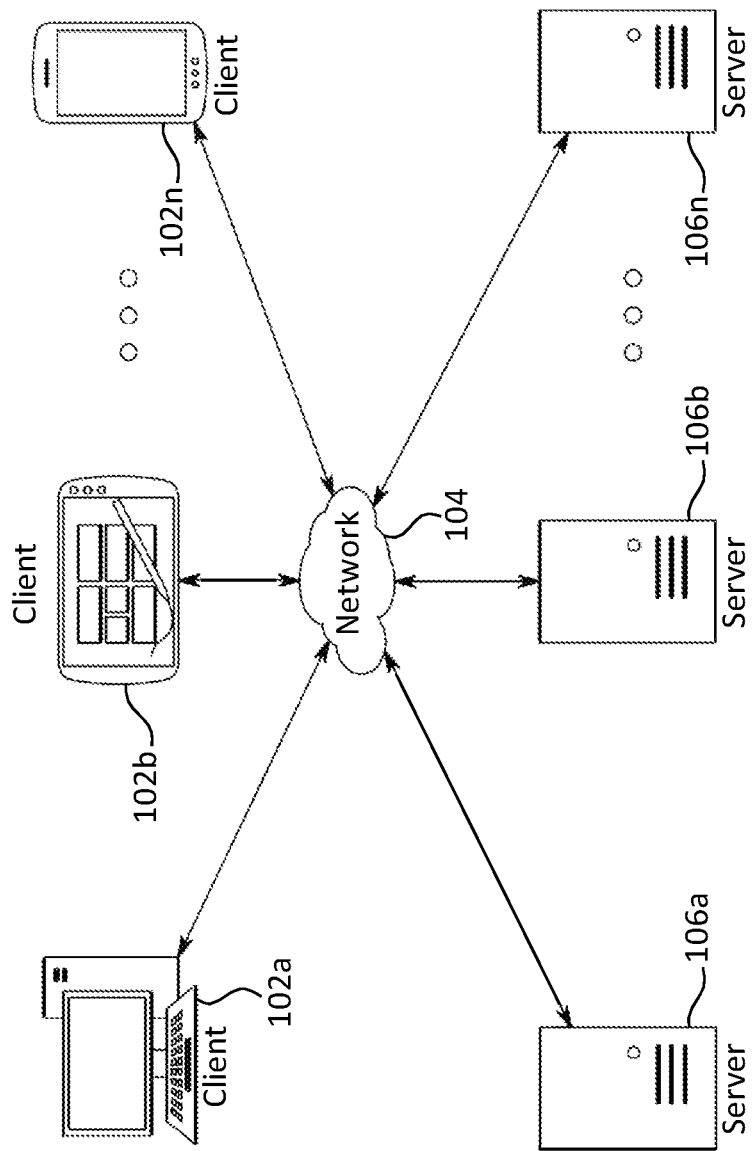
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, California.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
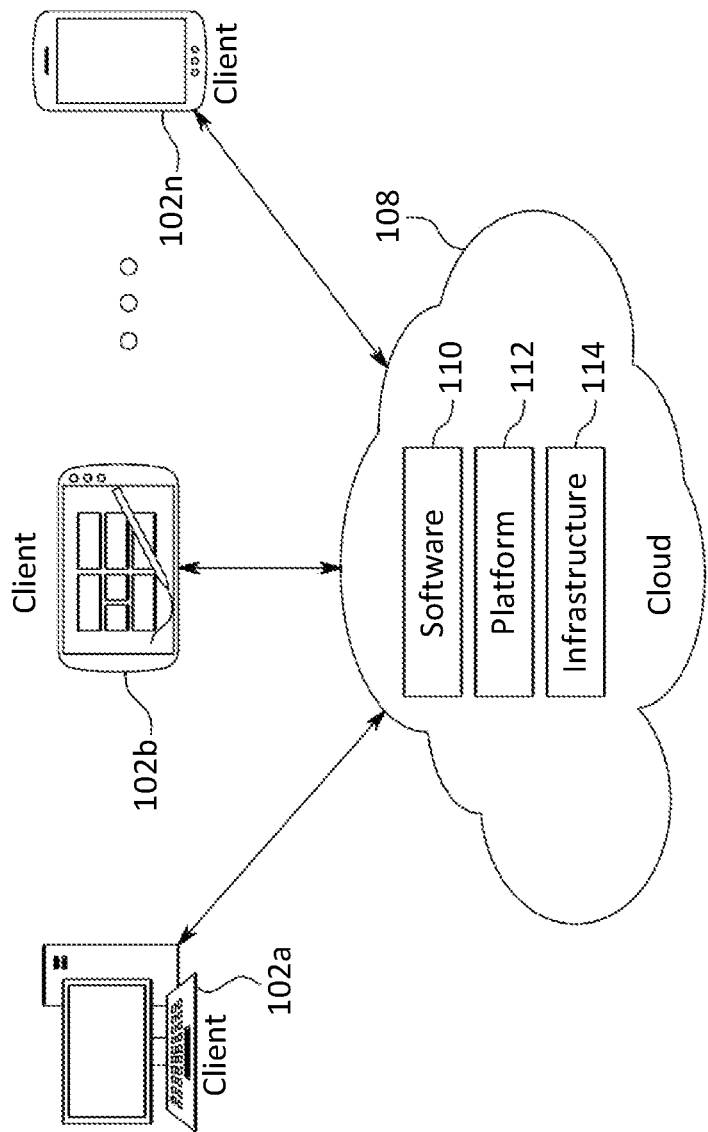
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over a Hypertext Transfer Protocol (HTTP) and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
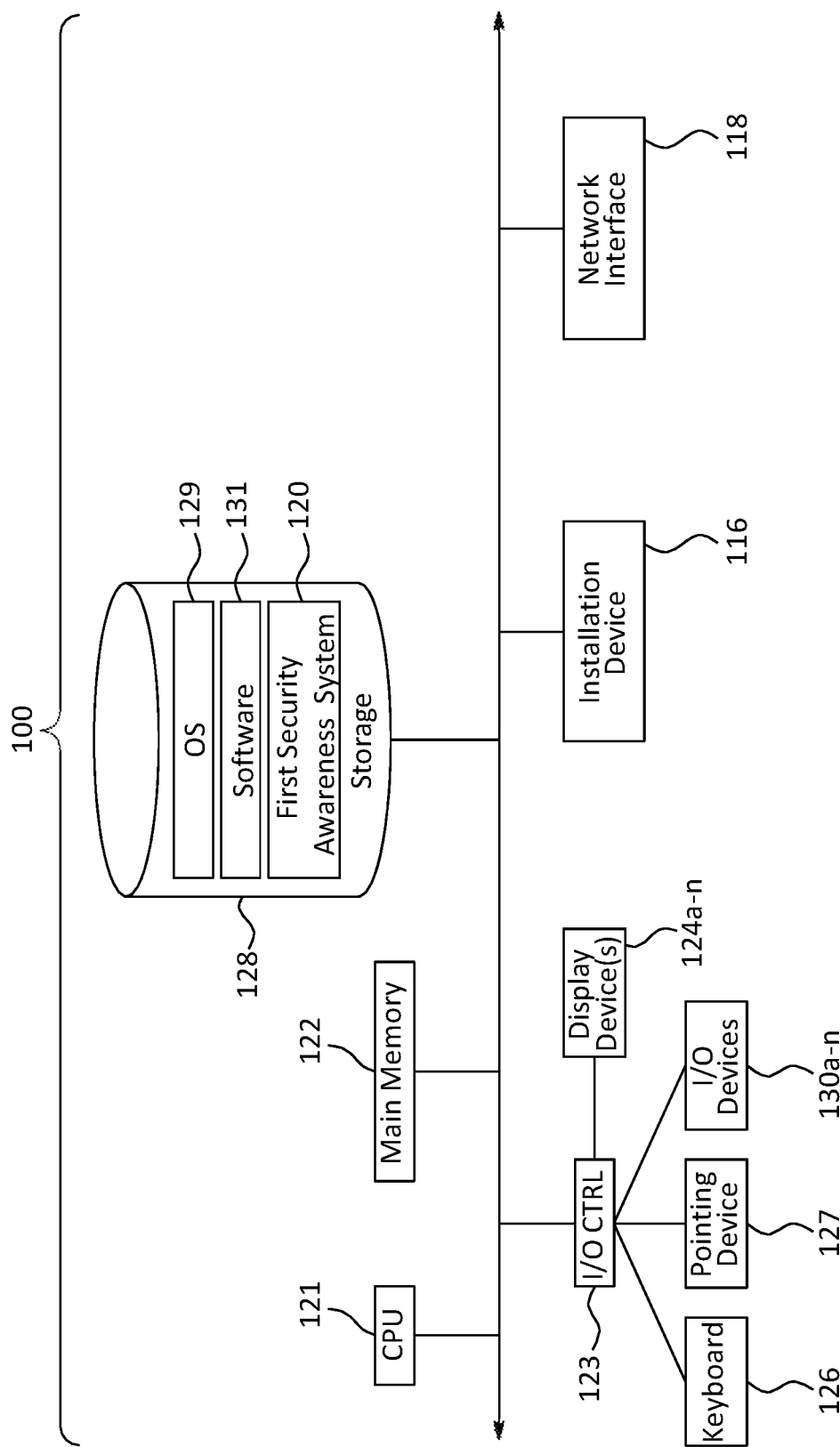
FIGS. 1C and 1D are block diagrams depicting embodiments of computing devices useful in connection with the methods and systems described herein, according to some embodiments.
Figure 1D:
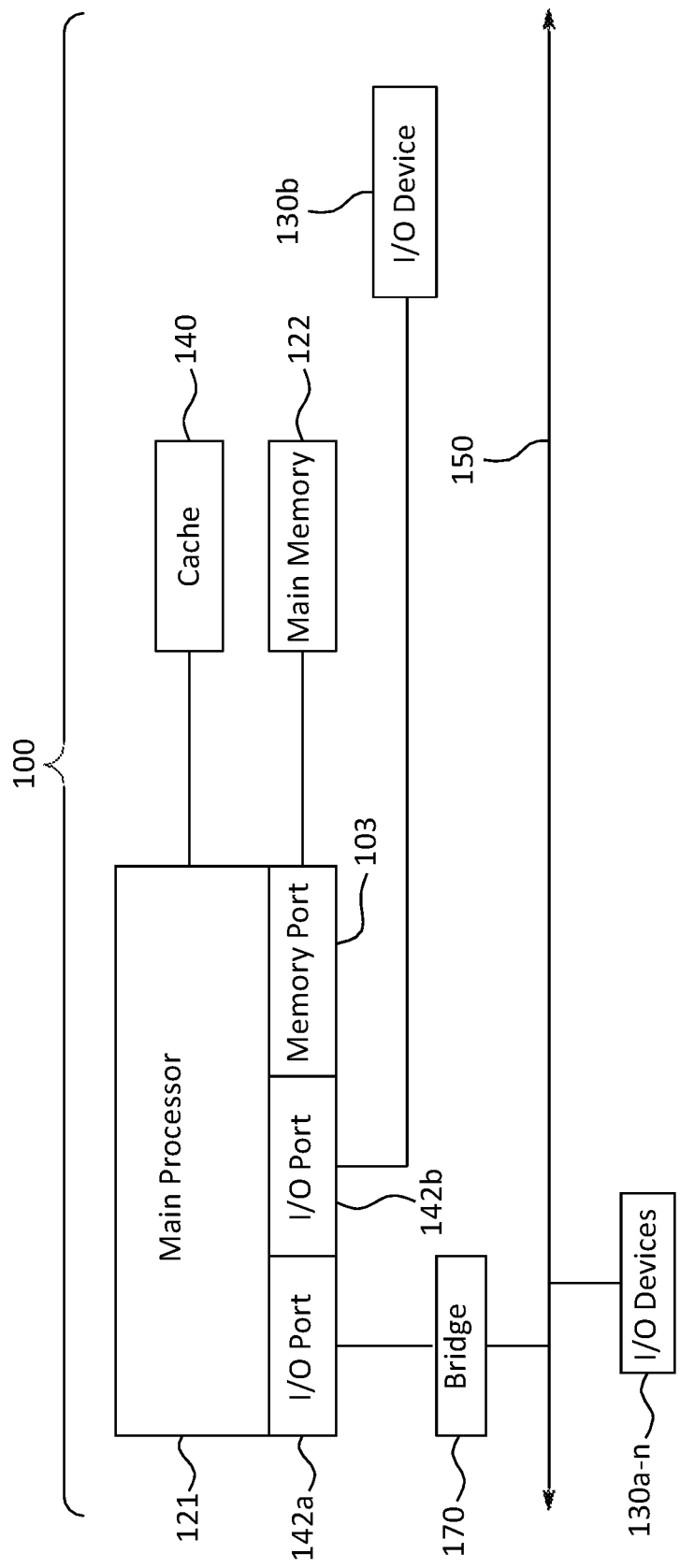

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of first security awareness system 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuity that responds to and processes instructions fetched from main memory unit 122. In many embodiments, central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of I/O devices 130a-130n and/or the I/O controller 123 may include any type and/or form of suitable hardware, software, or combination of hardware and software to support, enable or provide for the connection and use of multiple display devices 124a-124n by computing device 100. For example, computing device 100 may include any type and/or form of video adapter, video card, driver, and/or library to interface, communicate, connect or otherwise use display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to first security awareness system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, by Amazon.com, Inc. of Seattle, Washington. In other embodiments, computing device 100 is an eBook reader, e.g. the KINDLE family of devices by Amazon.com, or NOOK family of devices by Barnes & Noble, Inc. of New York City, New York.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Mitigating False Positives in Simulated Phishing Campaign The following describes systems and methods for mitigating false positives in a simulated phishing campaign due to the interaction with a third-party threat detection system.

An email client plug-in enables users (or employees) of an organization to report suspicious messages that they believe may be a threat to them or their organization. The email client plug-in may provide a User Interface (UI) element such as a button to trigger a function. In an example, functions or capabilities of the email client plug-in may be triggered/activated by a user action on the button. Upon triggering/activation, the email client plug-in may cause the email client to forward a suspicious message or a copy of the suspicious message to a threat detection platform associated with the email client plug-in for triage and further analysis to enable the identification of potential phishing threats and malicious actors.

There is a possibility (or even a probability) that there could be multiple security service providers for an organization. For example, a first security awareness system may manage network security, while a second security awareness system may provide email security. In some cases, both the first security awareness system and the second security awareness system may provide email client plug-ins that enable users to report messages in an email client. For example, a Phish Alert Button (PAB) plug-in and a Report Message Add-in may be provided to the email client. In an example, the PAB plug-in may be associated with the first security awareness system and the Report Message Add-in may be associated with the second security awareness system.

The first security awareness system may be a system that generates simulated phishing messages to test and develop cybersecurity awareness of the users, and manages risk score. Further, the second security awareness system may be a system that analyses messages reported to it as suspicious (for example, via the Report Message Add-in) and determines whether the messages present a risk to the organization.

However, having multiple email client plug-ins in the email client may confuse users and/or hinder operation of one or more email client plug-ins. For example, the users may not be able to use the PAB plug-in button if the Report Message Add-in button is present in the email client as it may obstruct operation of the PAB plug-in button, and vice versa. If a user of the organization reports a suspicious message using a particular email client plug-in, the reported message is handled according to a security awareness system associated with that email client plug-in. For example, when the user reports a suspicious message using the Report Message Add-in, the reported message (i.e., the suspicious message) is forwarded to and analyzed by the second security awareness system instead of the reported message being forwarded to and analyzed by the first security awareness system.

In examples, the analysis of the reported message includes "detonation" of the reported message. In an example, detonation of a message may be understood as actions performed by a security awareness system to actuate or interact with links, attachments, and/or any interactable element of the message to test them for maliciousness. Detonation of messages is usually done within a safe environment, such as in a quarantined environment or a sandboxed environment so that no harm is caused to a computing environment the messages are detonated in. If a reported message is a simulated phishing message sent to a user by the first security awareness system, but it is detonated by the second security awareness system, the first security awareness system may get an indication that an interaction has occurred with the simulated phishing message and the first security awareness system may erroneously associate the message interaction (i.e., the action) with a user, rather than with the second security awareness system. Thus, although the user correctly reported the simulated phishing message as suspicious, the first security awareness system may erroneously associate the simulated phishing message interaction with the user Currently, this message interaction initiated by automation of the second security awareness system is not differentiated in the first security awareness system from an action taken by a user. This creates a "false positive" scenario in which the first security awareness system interprets the detonation of the simulated phishing message as the user interacting with the simulated phishing message, leading to unreliable metrics of security behavior, an inaccurate risk score for the user, and unsuitable action to correct user security awareness behavior.

The systems and methods of the present disclosure leverage a first security awareness system for analyzing messages reported as suspicious to a second security awareness system in near real-time. The first security awareness system may be associated with a first threat detection platform and a first email client plug-in. The second security awareness system may be associated with a second threat detection platform and a second email client plug-in. In an example, the messages reported as suspicious may include simulated phishing messages generated by the first security awareness system. Further, the messages may have been reported by a user of an organization via the second email client plug-in. According to an implementation, the first security awareness system may determine content of the messages and remove any reported interaction with simulated phishing messages (generated by the second security awareness system) which has been associated incorrectly to the user. The user may be an individual who may have to be tested and/or trained by the first security awareness system. Further, the user may be an employee of the organization, a member of a group, or any individual that can receive an electronic message, or who may act in any capacity of the first security awareness system, such as a system administrator.

According to an implementation, the second security awareness system or the second threat detection platform may be configured to forward all messages reported as suspicious to the second threat detection system to a monitoring mailbox. In an example, the monitoring mailbox may be implemented on the first security awareness system, second security awareness system, on a client's server, or any other server that is suitable for hosting it. The monitoring mailbox may be configured to further forward the messages to a final mailbox which is used for monitoring. In some implementations, the first security awareness system may periodically scan the monitoring mailbox. Through these mechanisms the first security awareness system may have access to all messages that have been reported as suspicious phishing messages via the second email client plug-in.

According to one or more embodiments, the first security awareness system may analyze interactions that may have occurred with the reported messages by the second threat detection system to further mitigate the effect of false positives being added to user metrics coming from automatic detonation of the reported messages initiated by the second security awareness system.

Figure 2:
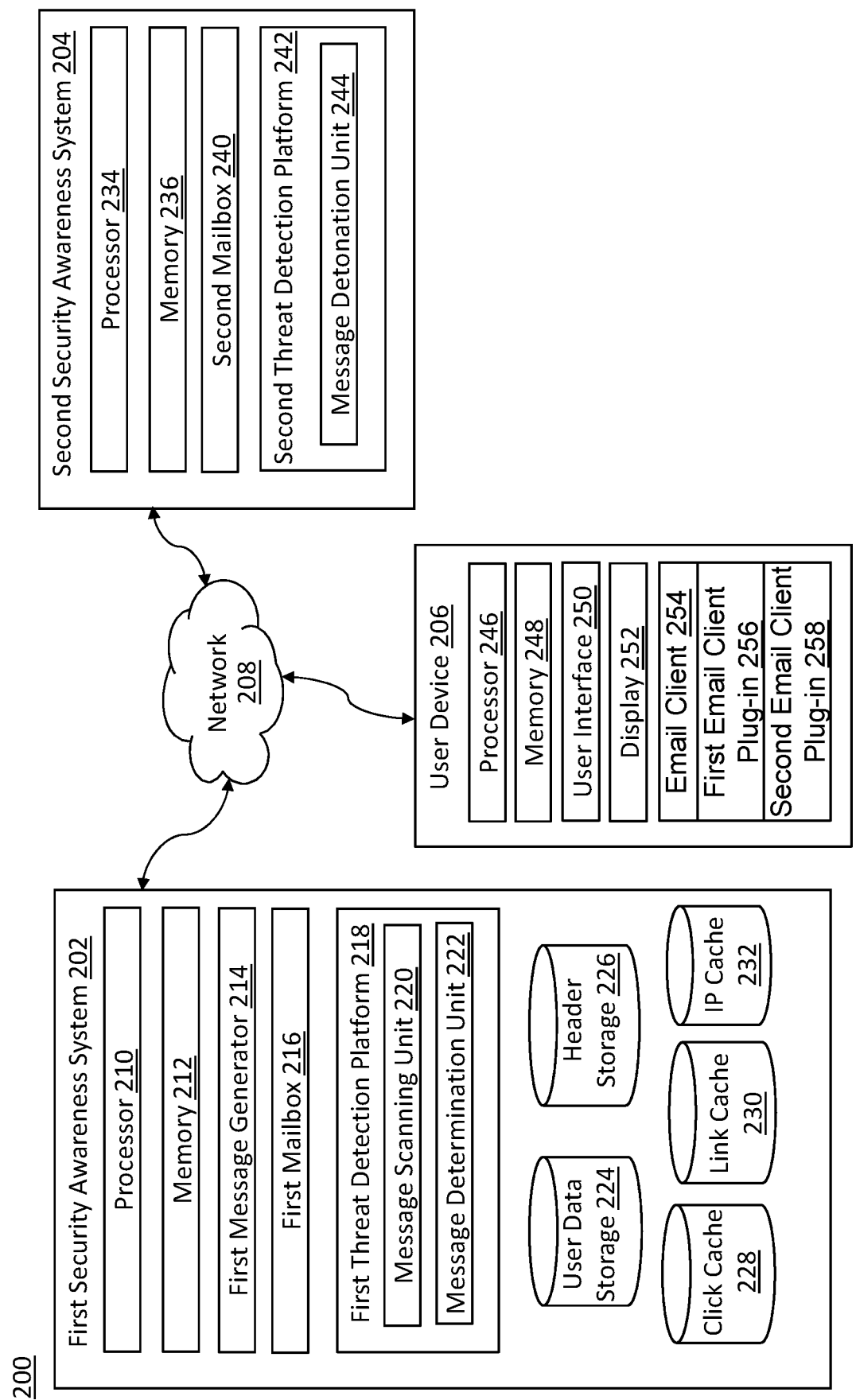
FIG. 2 depicts an implementation of some of an architecture of an implementation of a system for mitigating false positives in a simulated phishing campaign, according to some embodiments.

FIG. 2 depicts an implementation of some of an architecture of an implementation of system 200 for mitigating false positives in a simulated phishing campaign, according to some embodiments.

System 200 may include first security awareness system 202, second security awareness system 204, user device 206, and network 208 enabling communication between the system components for information exchange. Network 208 may be an example or instance of network 104, details of which are provided with reference to FIG. 1A and its accompanying description.

According to some embodiments, first security awareness system 202 may be implemented in a variety of computing systems, such as a mainframe computer, a server, a network server, a laptop computer, a desktop computer, a notebook, a workstation, and any other computing system. In an implementation, first security awareness system 202 may be implemented in a server, such as server 106 shown in FIG. 1A. In some implementations, first security awareness system 202 may be implemented by a device, such as computing device 100 shown in FIGS. 1C and 1D. In some embodiments, first security awareness system 202 may be implemented as a part of a cluster of servers. In some embodiments, first security awareness system 202 may be implemented across a plurality of servers, thereby, tasks performed by first security awareness system 202 may be performed by the plurality of servers. These tasks may be allocated among the cluster of servers by an application, a service, a daemon, a routine, or other executable logic for task allocation.

In one or more embodiments, first security awareness system 202 may facilitate cybersecurity awareness training, for example via simulated phishing campaigns. A simulated phishing campaign is a technique of testing a user to see whether the user is likely to recognize a true malicious phishing attack and act appropriately upon receiving the malicious phishing attack. In some embodiments, the user may be an employee of the organization, a customer, or a vendor, or anyone associated with the organization. In some embodiments, the user may be an end-customer/consumer or a patron using the goods and/or services of the organization. In an implementation, first security awareness system 202 may execute the simulated phishing campaign by sending out one or more simulated phishing messages periodically or occasionally to the users and observe responses of the users to such simulated phishing messages. A simulated phishing message may mimic a real phishing message and appear genuine to entice a user to respond/interact with the simulated phishing message. Further, a simulated phishing message may include links, attachments, macros, or any other simulated phishing threat that resembles a real phishing threat. In response to a user interaction with the simulated phishing message, for example if the user clicks on a link (i.e., a simulated phishing link), the user may be provided with security awareness training. If and how the user interacts with the simulated phishing message may be logged and may impact a risk score of the user, a team of which the user is part of, the organization, and an industry to which the organization belongs.

In some implementations, first security awareness system 202 may be owned or managed or otherwise associated with an organization or any entity authorized thereof. In an implementation, first security awareness system 202 may be managed by a system administrator. The system administrator may be a professional (or a team of professionals) managing organizational cybersecurity aspects. The system administrator may oversee and manage first security awareness system 202 to ensure cybersecurity goals of the organization are met. In an example, first security awareness system 202 may be a Computer Based Security Awareness Training (CBSAT) system that performs security services such as performing simulated phishing campaigns on a user or a set of users of an organization as a part of security awareness training.

Referring again to FIG. 2, second security awareness system 204 may be implemented in a variety of computing systems, such as a mainframe computer, a server, a network server, a laptop computer, a desktop computer, a notebook, a workstation, and any other computing system. In an implementation, second security awareness system 204 may be implemented in a server, such as server 106 shown in FIG. 1A. In some implementations, second security awareness system 204 may be implemented by a device, such as computing device 100 shown in FIGS. 1C and 1D. In some embodiments, second security awareness system 204 may be implemented as a part of a cluster of servers. In some embodiments, second security awareness system 204 may be implemented across a plurality of servers, thereby, tasks performed by second security awareness system 204 may be performed by the plurality of servers. These tasks may be allocated among the cluster of servers by an application, a service, a daemon, a routine, or other executable logic for task allocation.

Referring again to FIG. 2, in some embodiments, user device 206 may be any device used by the user. User device 206 as disclosed, may be any computing device, such as a desktop computer, a laptop, a tablet computer, a mobile device, a Personal Digital Assistant (PDA) or any other computing device. In an implementation, user device 206 may be a device, such as client device 102 shown in FIG. 1A and FIG. 1B. User device 206 may be implemented by a device, such as computing device 100 shown in FIG. 1C and FIG. 1D.

According to some embodiments, first security awareness system 202 may include processor 210 and memory 212. For example, processor 210 and memory 212 of first security awareness system 202 may be CPU 121 and main memory 122 respectively as shown in FIGS. 1C and 1D. In an embodiment, first security awareness system 202 may include first message generator 214. First message generator 214 may be an application, service, daemon, routine, or other executable logic for generating messages. The messages generated by first message generator 214 may be of any appropriate format. For example, the messages may be email messages, text messages, short message service (SMS) messages, instant messaging (IM) messages used by messaging applications such as WhatsApp™, or any other type of message. The message type to be used in a particular simulated phishing message may be determined by, for example, first security awareness system 202. The messages may be generated in any appropriate manner, e.g. by running an instance of an application that generates the desired message type, such as a Gmail® application, Microsoft Outlook™, WhatsApp™, a text messaging application, or any other appropriate application. The messages may be generated to be in a format consistent with specific messaging platforms, for example Outlook 365™, Outlook® Web Access (OWA), Webmail™ iOS®, Gmail®, and any other messaging platform. In an implementation, first message generator 214 may be configured to generate simulated phishing messages. The simulated phishing messages may be used in simulated phishing campaigns. In an implementation, first message generator 214 may communicate one or more simulated phishing messages to a user of user device 206 as a part of a security awareness training program.

In an implementation, first security awareness system 202 may also include first mailbox 216. In an example, first mailbox 216 may be a destination to which messages, such as email messages are delivered. First mailbox 216 may be identified by an email address. In an example, first mailbox 216 may be a monitoring mailbox.

First security awareness system 202 may include first threat detection platform 218. In an implementation, first threat detection platform 218 may be an electronic system configured to manage online security threats including phishing threats faced by the organization or by users of the organization. According to an implementation, first threat detection platform 218 may be configured to monitor, identify, and manage security threats while collecting and analyzing data to prevent further security threats. In an example, first threat detection platform 218 may receive, from second security awareness system 204, messages that users have reported as suspicious or likely to be malicious. In some embodiments, first security awareness system 202 and/or first threat detection platform 218 may host applications that provide additional and/or custom features to user device 206. Although it is shown that first threat detection platform 218 is implemented in first security awareness system 202, in some embodiments, first threat detection platform 218 may be implemented external to first security awareness system 202. In an example, first threat detection platform 218 may be KnowBe4's PhishER™ platform.

According to an embodiment, first threat detection platform 218 may include message scanning unit 220 and message determination unit 222. In an implementation, message scanning unit 220 and message determination unit 222 may be coupled to processor 210 and memory 212. In some embodiments, message scanning unit 220 and message determination unit 222 amongst other units, may include routines, programs, objects, components, data structures, etc., which may perform particular tasks or implement particular abstract data types. Message scanning unit 220 and message determination unit 222 may also be implemented as, signal processor(s), state machine(s), logic circuitries, and/or any other device or component that manipulate signals based on operational instructions.

In some embodiments, message scanning unit 220 and message determination unit 222 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor which executes instructions to cause the general-purpose processor to perform the required tasks or, the processing unit may be dedicated to performing the required functions. In some embodiments, message scanning unit 220 and message determination unit 222 may be machine-readable instructions which, when executed by a processor/processing unit, perform any of desired functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in memory 212.

In some embodiments, first security awareness system 202 may include user data storage 224, header storage 226, click cache 228, link cache 230, and internet protocol (IP) cache 232. In an implementation, user data storage 224 may store information such as metadata relating to users. In some examples, user data storage 224 may store personal information of the users. In some implementations, user data storage 224 may also store information associated with actions performed by the users with respect to simulated phishing campaigns, training campaigns, remedial trainings, and other such campaigns and trainings. For example, user data storage 224 may also store information associated with interactions of the users with simulated phishing messages and real phishing messages. In an example, user data storage 224 may store a user record of each user. In an example, the user record may include a risk score. The risk score of the user may include a representation of the susceptibility of the user to a malicious attack. Also, the risk score for a user quantifies a cybersecurity risk that the user poses to an organization. In an example, the risk score of the user may be modified based on the user's responses to simulated phishing messages, completion of training by the user, a current position of the user in the organization, a size of a network of the user, an amount of time the user has held the current position in the organization, and/or any other attribute that can be associated with the user. In an implementation, a higher risk score of the user indicates that a higher security risk is associated with the user and a lower risk score indicates that the user has a better security awareness.

According to an implementation, header storage 226 may store one or more extension headers. One example of an extension header may include an X-header. An X-header may be understood as a custom proprietary email header that allows capabilities that are not offered with standard email headers. X-headers are called such because their name begins with "X-" (to delineate them from standardized header fields). X-headers may be added to emails for various reasons, for example to mark emails as unwanted. An example of marking emails as unwanted is providing in X-header: "X-Spam-Status: Yes". In some examples, an X-header may include a predetermined identifier (for example, for identifying an email (or a message) as a simulated phishing email (or a simulated phishing message). In an implementation, predetermined identifiers associated with the X-headers may also be stored in header storage 226.

According to an implementation, click cache 228 may be a short-term cache that stores all reported clicks managed by first security awareness system 202. In an implementation, a depth of click cache 228 may be configurable. In an example, the depth of click cache 228 may be in order of seconds. Click cache 228 may be associated with a predetermined delay. In an example, click cache 228 may be a first in first out (FIFO) cache, a least recently used (LRU) cache, a minimum cache, or any other type of cache. For example, data in click cache 228 may be delayed by a FIFO block having configurable (delay) value of $N_{click}$ seconds.

In an implementation, link cache 230 may be a short-term cache that stores links that have a high probability of being initiated/followed by second security awareness system 204. In an example, link cache 230 may store links (or link data) associated with simulated phishing messages that have been or might be followed by second security awareness system 204. A depth of link cache 230 may also be configurable. In an example, the depth of link cache 230 may be in order of minutes or hours. For example, link cache 230 may store the links for 24 hours.

According to an implementation, IP cache 232 may be a cache that stores IP addresses known to be used by second security awareness system 204. In an example implementation, IP cache 232 may store the IP addresses permanently or until they are cleared by first security awareness system 202. For example, a system administrator of first security awareness system 202 may remove the IP addresses from IP cache 232 as and when required. In some example implementations, the IP addresses stored in IP cache 232 may have a configurable lifetime to allow changes to these IP addresses over time. In an example, lifetime of the IP addresses in IP cache 232 may be in order of days.

Information related to the users of the organization stored in user data storage 224, the one or more extension headers and their corresponding predetermined identifiers stored in header storage 226, information related to the reported clicks stored in click cache 228, information related to the links stored in link cache 230, and information related to the IP addresses known to be used by second security awareness system 204 and stored in IP cache 232 may be periodically or dynamically updated as required.

Referring again to FIG. 2, in some embodiments, second security awareness system 204 may include processor 234 and memory 236. For example, processor 234 and memory 236 of second security awareness system 204 may be CPU 121 and main memory 122 respectively as shown in FIGS. 1C and 1D.

In an implementation, second security awareness system 204 may also include second mailbox 240. In an example, second mailbox 240 may be a destination to which messages, such as email messages are delivered. Second mailbox 240 may be identified by an email address. In an example, second mailbox 240 may be a monitoring mailbox. Although, it is described that second mailbox 240 is implemented in or associated with second security awareness system 204, in some implementations, second mailbox 240 may be implemented in a client's server or in the cloud. In an example, the client may be an entity that is subscribed to or makes use of services provided by first security awareness system 202 and/or second security awareness system 204.

Second security awareness system 204 may include second threat detection platform 242. In an implementation, second threat detection platform 242 may be an electronic system configured to manage online security threats including phishing threats faced by the organization or by users of the organization. According to an implementation, second threat detection platform 242 may be configured to monitor, identify, and manage security threats while collecting and analyzing data to prevent further security threats. In an example, second threat detection platform 242 may receive messages that users have reported as suspicious or likely to be malicious. In some embodiments, second security awareness system 204 and/or second threat detection platform 242 may host applications that provide additional and/or custom features to user device 206. Although it is shown that second threat detection platform 242 is implemented in second security awareness system 204, in some embodiments, second threat detection platform 242 may be implemented external to second security awareness system 204. In an example, second threat detection platform 242 may be Microsoft's Advanced Threat Protection (ATP) application or any third-party platform.

According to an embodiment, second threat detection platform 242 may include message detonation unit 244. Message detonation unit 244 may actuate or interact with elements of reported message including links, attachments, and/or any interactable element of the message to test them for maliciousness within a safe or controlled environment. In some embodiments, message detonation unit 244 may remove the malicious elements from the reported message. In an implementation, message detonation unit 244 may be coupled to processor 234 and memory 236. In some embodiments, message detonation unit 244 amongst other units, may include routines, programs, objects, components, data structures, etc., which may perform particular tasks or implement particular abstract data types. Message detonation unit 244 may also be implemented as, signal processor(s), state machine(s), logic circuitries, and/or any other device or component that manipulate signals based on operational instructions.

In some embodiments, message detonation unit 244 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor which executes instructions to cause the general-purpose processor to perform the required tasks or, the processing unit may be dedicated to performing the required functions. In some embodiments, message detonation unit 244 may be machine-readable instructions which, when executed by a processor/processing unit, perform any of desired functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in memory 236.

Referring again to FIG. 2, in some embodiments, user device 206 may be any device used by a user. The user may be an employee of an organization or any entity. According to some embodiments, user device 206 may include processor 246 and memory 248. In an example, processor 246 and memory 248 of user device 206 may be CPU 121 and main memory 122, respectively, as shown in FIGS. 1C and 1D. User device 206 may also include user interface 250 such as a keyboard, a mouse, a touch screen, a haptic sensor, voice-based input unit, or any other appropriate user interface. It shall be appreciated that such components of user device 206 may correspond to similar components of computing device 100 in FIGS. 1C and 1D, such as keyboard 126, pointing device 127, I/O devices 130*a-n* and display devices 124*a-n*. User device 206 may also include display 252, such as a screen, a monitor connected to the device in any manner, or any other appropriate display. In an implementation, user device 206 may display received content (for example, simulated phishing messages) for the user using display 252 and is able to accept user interaction via user interface 250 responsive to the displayed content.

In some embodiments, user device 206 may include email client 254. In one example implementation, email client 254 may be an application installed on user device 206. In another example implementation, email client 254 may be an application that can be accessed over network 208 through a browser without requiring to be installed on user device 206. In an implementation, email client 254 may be any application capable of composing, sending, receiving, and reading email messages. For example, email client 254 may be an instance of an application, such as Microsoft Outlook™ application, IBM® Lotus Notes® application, Apple® Mail application, Gmail® application, or any other known or custom email application. In an implementation, email client 254 may be configured to receive simulated phishing messages from first security awareness system 202 and second security awareness system 204. In an example, a user of user device 206 may be mandated to download and install email client 254 by the organization. In another example, email client 254 may be provided by the organization as default. In some examples, a user of user device 206 may select, purchase and/or download email client 254, through for example, an application distribution platform. The term "application" as used herein may refer to one or more applications, services, routines, or other executable logic or instructions.

In one or more embodiments, email client 254 may include first email client plug-in 256 and second email client plug-in 258. An email client plug-in may be an application program that may be included in an email client for providing one or more additional features to enable customization. The email client plug-in may be provided by the same entity that provides the email client software or may be provided by a different entity. In an example, email client plug-in may include a User Interface (UI) element such as a button to trigger a function. Functionality of client-side plug-ins that use a UI button may be triggered when a user clicks the button. Some examples of client-side plug-ins that use a UI button include, but are not limited to, a Phish Alert Button (PAB) plug-in, a Report Message Add-in, a task create plug-in, a spam marking plug-in, an instant message plug-in, a social media reporting plug-in and a search and highlight plug-in. In an embodiment, first email client plug-in 256 may be a PAB plug-in and second email client plug-in 258 may be a Report Message Add-in.

In some implementations, first email client plug-in 256 and second email client plug-in 258 may not be implemented in email client 254 but may coordinate and communicate with email client 254. In some implementations, each of first email client plug-in 256 and second email client plug-in 258 is an interface local to email client 254 that supports email client users. In one or more embodiments, each of first email client plug-in 256 and second email client plug-in 258 may be an application that supports the user, i.e., recipients of simulated phishing messages, to report suspicious phishing messages that they believe may be a threat to them or their organization. Other implementations of first email client plug-in 256 and second email client plug-in 258 not discussed here are contemplated herein. In one example, first email client plug-in 256 may provide the PAB plug-in through which functions or capabilities of first email client plug-in 256 are triggered/activated by a user action on the button. Upon activation, first email client plug-in 256 may forward content (for example, suspicious phishing message) to a system administrator. In some embodiments, first email client plug-in 256 may cause email client 254 to forward content to first threat detection platform 218, second threat detection platform 242, and/or or an Incident Response (IR) team of the organization for threat triage, quarantine or threat identification. In some embodiments, email client 254 or first email client plug-in 256 may send a notification to each of first threat detection platform 218 and second threat detection platform 242 that a user has reported content received at email client 254 as potentially malicious. Thus, the PAB plug-in button enables a user to report suspicious content.

In one example, second email client plug-in 258 may provide the Report Message Add-in through which functions or capabilities of second email client plug-in 258 are triggered/activated by a user action on the button. Upon activation, second email client plug-in 258 may forward content (for example, suspicious phishing message) to a system administrator. In some embodiments, second email client plug-in 258 may cause email client 254 to forward content to first threat detection platform 218, second threat detection platform 242, and/or or an Incident Response (IR) team of the organization for threat triage, quarantine or threat identification. In some embodiments, email client 254 or second email client plug-in 258 may send a notification to each of first threat detection platform 218 and second threat detection platform 242 that a user has reported content received at email client 254 as potentially malicious. Thus, the Report Message Add-in button enables a user to report suspicious content.

As described earlier, first security awareness system 202 (and/or first threat detection platform 218) and second security awareness system 204 (and/or second threat detection platform 242) may host applications that provide additional and/or custom features to user device 206. In an implementation, each of first threat detection platform 218 and second threat detection platform 242 may host third-party applications that provide additional and/or custom features to email client 254. In an implementation, first threat detection platform 218 may communicate with first email client plug-in 256 to provide additional and/or custom features to email client 254. In some implementations, first email client plug-in 256 is provided to user device 206 (or email client 254) by first threat detection platform 218. In an implementation, second threat detection platform 242 may communicate with second email client plug-in 258 to provide additional and/or custom features to email client 254. In some implementations, second email client plug-in 258 is provided to user device 206 (or email client 254) by second threat detection platform 242.

In an example implementation, on receiving a message (such as an email), if the user of the user device 206 suspects that the message is potentially malicious, the user may report the message using second email client plug-in 258. In an implementation, second email client plug-in 258 may provide a UI element such as the Report Message Add-in button in email client 254 of user device 206. In an example, when the user receives a message and the user suspects that the message is potentially malicious, then the user may click on the UI element such as a button using, for example, a mouse pointer to report the message. In some implementations, when the user selects to report, via the UI element, the message, second email client plug-in 258 may receive an indication that the user has reported the message received at the user's mailbox. In response to receiving the indication that the user has reported the message, second email client plug-in 258 may cause email client 254 to forward the message (suspicious message) to second security awareness system 204 (or a component therein, such as second threat detection platform 242) for quarantine and detonation of the reported message. According to an implementation, in response to receiving the reported message, message detonation unit 244 of second threat detection platform 242 may detonate the reported message. In an example, detonation of the reported message may be understood as actions performed by second threat detection platform 242 to actuate or interact with links, attachments, or any interactable element of the reported message to test it for maliciousness. In an example, second threat detection platform 242 may follow one or more links included in the reported message to test the reported message for maliciousness.

According to an implementation, subsequent to receiving the reported message, second security awareness system 204 may concurrently forward the reported message, for example, to first security awareness system 202 (or a component therein, such as first threat detection platform 218). In an implementation, second security awareness system 204 may forward the reported message using one or more standard email protocols, such as Simple Message Transfer Protocol (SMTP) and Multipurpose Internet Mail Extension (MIME) Protocol. In some implementations, second security awareness system 204 may forward the reported message to first security awareness system 202 through carbon copy (CC), blind carbon copy (BCC), or direct addition to first mailbox 216.

In some implementations, second security awareness system 204 may forward the reported message to second mailbox 240. In an implementation, in response to receiving the reported message, second mailbox 240 may in turn be configured to forward the reported message to first mailbox 216 associated with first security awareness system 202. In some implementations, first security awareness system 202 may periodically or continuously scan the second mailbox 240 for the reported message. Other techniques of forwarding the reported message to first security awareness system 202 not discussed here are contemplated herein.

In an implementation, second threat detection platform 242 may forward the reported message to an email address associated with first security awareness system 202 or first threat detection platform 218 for parallel monitoring of the reported message. In an example, if first threat detection platform 218 is KnowBe4's PhishER™ platform, then second threat detection platform 242 may forward the reported message to an example email address "report@knowbe4.com".

In some embodiments, second security awareness system 204 may forward all messages reported to it to first security awareness system 202. Through the mechanisms described above, first security awareness system 202 may have access to all messages that have been reported as suspicious or phishing messages via second email client plug-in 258. According to an implementation, there may be a difference in time between when second threat detection platform 242 forwards the reported messages to first security awareness system 202 and when the reported messages are detonated by second threat detection platform 242.

According to one or more embodiments, first security awareness system 202 may receive messages forwarded by second security awareness system 204. In an implementation, the messages received by first security awareness system 202 may be the messages of the user reported to second security awareness system 204 as suspicious. According to an implementation, first security awareness system 202 initiates processing when a message is reported by the user as suspicious via second threat detection platform 242 and is flagged to first security awareness system 202 via the mechanisms as described above. In an implementation, the message may include a suspicious element such a link that may have been followed. In other words, second threat detection platform 242 may have already detonated the reported message before forwarding it to first security awareness system 202 or before the reported message is received and/or processed by first security awareness system 202. In some implementations, the link in each message may not have been followed yet. In other words, second threat detection platform 242 may not have detonated the reported messages before forwarding the reported messages to first security awareness system 202 or before the reported messages are received and/or processed by first security awareness system 202.

According to an implementation, first security awareness system 202 may be configured to receive a message of a user reported to second security awareness system 204 as suspicious. The message may include a suspicious element such as a link that has been followed. In an implementation, first security awareness system 202 may be configured to receive the message forwarded by second security awareness system 204. In an example, first security awareness system 202 may be further configured to receive the message reported to second security awareness system 204 by one of monitoring or scanning second mailbox 240 within second security awareness system 204 for the message.

In an implementation, message scanning unit 220 may determine if the received message is a simulated phishing message generated by first security awareness system 202. To enable this determination, the simulated phishing message may include an extension header or a customized header that message scanning unit 220 may be configured to read and use to identify the message as a simulated phishing message generated by first security awareness system 202. In response to receiving the message, message scanning unit 220 may scan the message and inspect an extension header included in the message to determine if the message is a simulated phishing message generated by first security awareness system 202.

According to an implementation, message determination unit 222 may then hold link data of the followed link of the message in click cache 228 having a predetermined delay. In an example, the link data may include information related to the link included in the message. Upon expiration of the predetermined delay, message determination unit 222 may determine that the link was followed by second security awareness system 204 instead of being clicked by the user. In an implementation, to determine if the link was followed by second security awareness system 204, message determination unit 222 may identify if the link data in click cache 228 corresponds to link data in link cache 230. Responsive to identifying that the link data in click cache 228 corresponds to the link data in link cache 230, message determination unit 222 may determine that the link was followed by second security awareness system 204. In some implementations, message determination unit 222 may identify if an IP address of a click of the followed link corresponds to an IP address stored in IP cache 232 of IP addresses known to be associated with second security awareness system 204. Responsive to identifying that the IP address of the click of the followed link corresponds to the IP address stored in IP cache 232, message determination unit 222 may determine that the link was followed by second security awareness system 204.

In an implementation message determination unit 222 may be further configured to refresh an entry of the address of the followed link and the IP data (i.e. the IP address of the following entity) in link cache 230 and IP cache 232, respectively. In response to the determination, message determination unit 222 may exclude second security awareness system 204's following of the link of the message as an interaction of the user. In an implementation, message determination unit 222 may disassociate from the user record of the user, a click of the user for the followed link that was recorded for second security awareness system 204's following of the link of the message. The manner in which first security awareness system 202 processes the reported message is described in greater detail in conjunction with FIGS. 3A, 3B, 4A, 4B, and 4C.

Figure 3A:
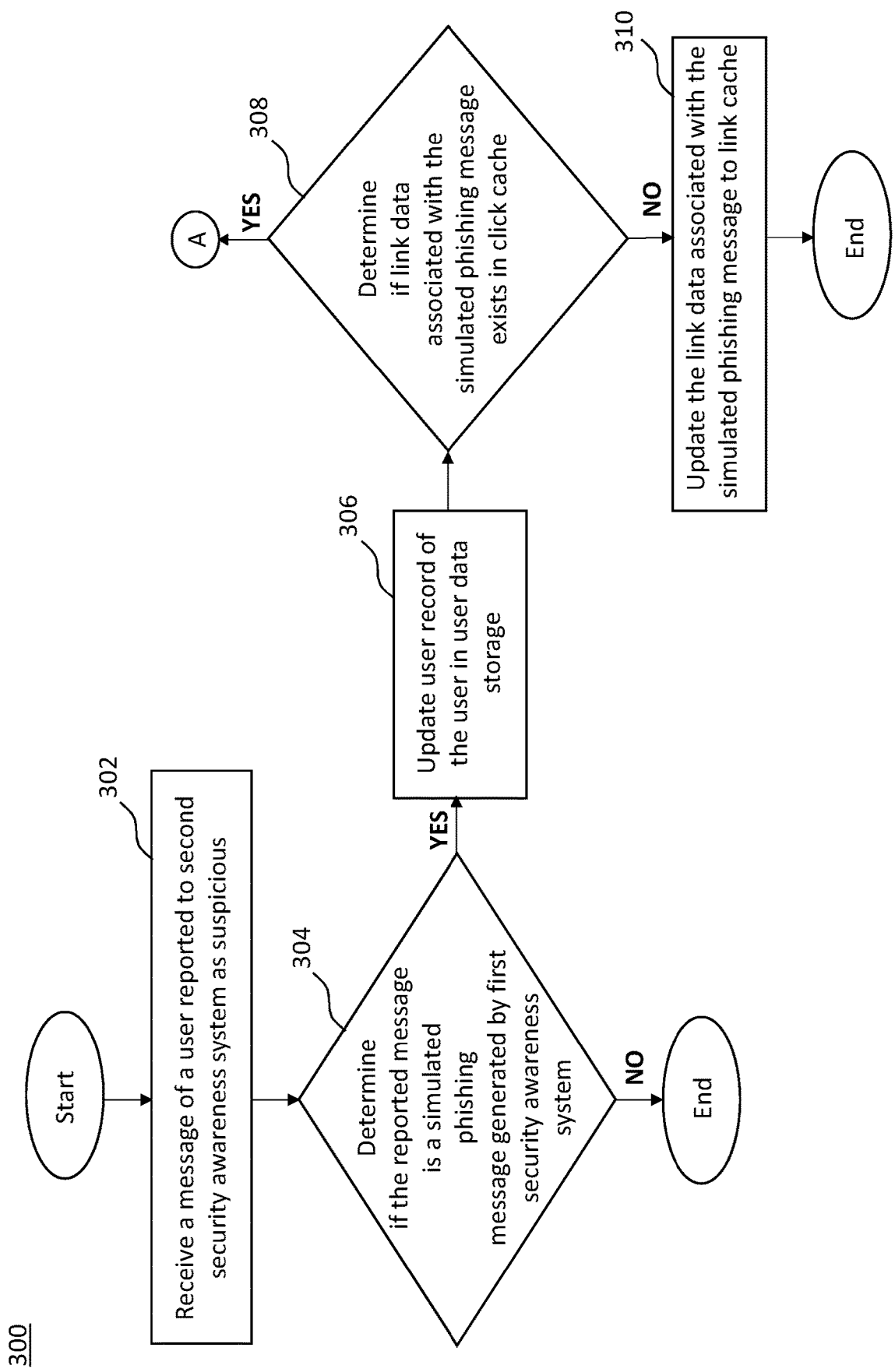
FIGS. 3A and 3B depict a process for processing of a message reported by a user as a suspicious message, according to some embodiments.
Figure 3B:
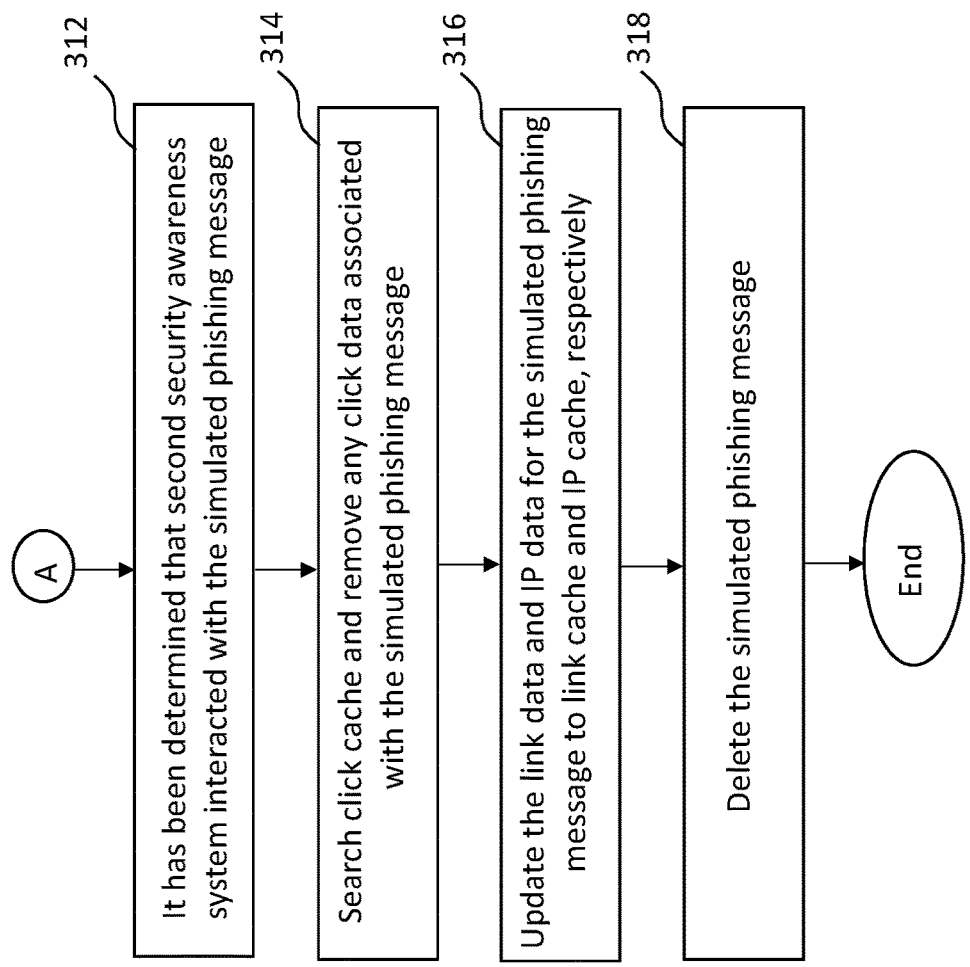

FIGS. 3A and 3B depict process 300 for processing of a message reported by a user as a suspicious message, according to some embodiments.

According to an implementation, the processing commences at block 302. At block 302 first security awareness system 202 may receive the message of the user reported to second security awareness system 204 as suspicious. In an example, the message may include one or more links (hereinafter referred to as a link). In an implementation, information related to the link included in the reported message may be referred to as link data. Process 300 then proceeds to block 304, where it is determined if the reported message is a simulated phishing message generated by first security awareness system 202. In an implementation, message scanning unit 220 of first threat detection platform 218 may determine if the reported message is a simulated phishing message generated by first security awareness system 202. To enable this determination, the simulated phishing message may include an extension header or a customized header that message scanning unit 220 may be configured to read and use to identify the reported message as the simulated phishing message generated by first security awareness system 202. In response to receiving the reported message, message scanning unit 220 may scan the reported message and inspect an extension header included in the reported message to determine if the reported message is a simulated phishing message generated by first security awareness system 202. According to an implementation, message scanning unit 220 may determine if the reported message is a simulated phishing message generated by first security awareness system 202 based on a presence of an extension header in the reported message. In an example, if the reported message includes the extension header, then it is determined that the reported message is a simulated phishing message generated by first security awareness system 202.

In some implementations, message scanning unit 220 may compare the extension header included in the reported message with the one or more extension headers stored in header storage 226. If the reported message does not include an extension header or the extension header included in the reported message does not match with the extension headers stored in header storage 226, process 300 proceeds along the NO branch and is terminated. According to an implementation, if the reported message does not include the extension header or the customized header (i.e., extension header included in the reported message does not match with the extension headers stored in header storage 226), then message scanning unit 220 may determine that the reported message is not generated by first security awareness system 202 or is not a simulated phishing message, and may be a genuine malicious message (or a real malicious phishing message), a benign message, or a simulated phishing message generated by second security awareness system 204.

According to an implementation, if the presence of the extension header is detected in the reported message or if the extension header included in the reported message matches with one of the extension headers stored in header storage 226, message scanning unit 220 determines that the reported message is a simulated phishing message generated by first security awareness system 202 and process 300 proceeds along the YES branch to block 306. In an implementation, when message scanning unit 220 determines that the reported message is the simulated phishing message generated by first security awareness system 202, then message scanning unit 220 determines whether any interaction with the link in the reported messages was initiated by second security awareness system 204 or by the user. In an example, the result of determination may affect the user's security awareness user metrics or risk score. In an implementation, an action including interacting with a link or following of a link included in the reported message may be referred to as a "click". Further, information related to the interaction with the reported message may be referred to as click data. Also, in an implementation, the information related to the link that has been followed or interacted with may include an IP address of an entity that followed the link. In an example, the information related to the IP address of the entity may be referred to as IP data.

At block 306, a user record of the user is updated in user data storage 224. In an implementation, message scanning unit 220 may update the user record of the user in user data storage 224 to reflect that the user reported the simulated phishing message. Thereafter, process 300 proceeds to block 308. At block 308, it is determined if link data associated with the simulated phishing message exists in click cache 228. According to an implementation, message determination unit 222 may determine if the link data associated with the simulated phishing message exists in click cache 228. If the link data associated with the simulated phishing message does not exist in click cache 228, process 300 proceeds along a NO branch to block 310. At block 310, the link data associated with the simulated phishing message is updated to link cache 230 and process 300 is terminated. If the link data associated with the simulated phishing message exists in click cache 228, process 300 proceeds along a YES branch to block 312. In a scenario where the simulated phishing message has been detonated (i.e., the link included in the simulated phishing message has been followed), there may be data associated with the simulated phishing message in click cache 228.

According to an implementation, at block 312 it has been determined that second security awareness system 204 interacted with the simulated phishing message. In an implementation, message determination unit 222 may determine that second security awareness system 204 interacted with the simulated phishing message or detonated the simulated phishing message. Process 300 then proceeds to block 314, whereupon, click cache 228 is searched and click data associated with the simulated phishing message may be removed. According to an implementation, message determination unit 222 may search click cache 228 and remove the click data associated with the simulated phishing message from click cache 228. Thereafter, process 300 proceeds to block 316. At block 316, the link data and the IP data for the simulated phishing message may be updated to link cache 230 and IP cache 232, respectively. In an implementation, message determination unit 222 may update link cache 230 and IP cache 232 with the link data and IP data for the simulated phishing message, respectively. Then at block 318, the simulated phishing message is deleted. In an implementation, message determination unit 222 may delete the simulated phishing message. According to one or more embodiments, process 300 is executed each time a message is reported to second security awareness system 204 via second email client plug-in 258. In some implementations, steps of blocks 312 to 318 may not be carried out and process 300 may terminate after processing of block 310.

Figure 4A:
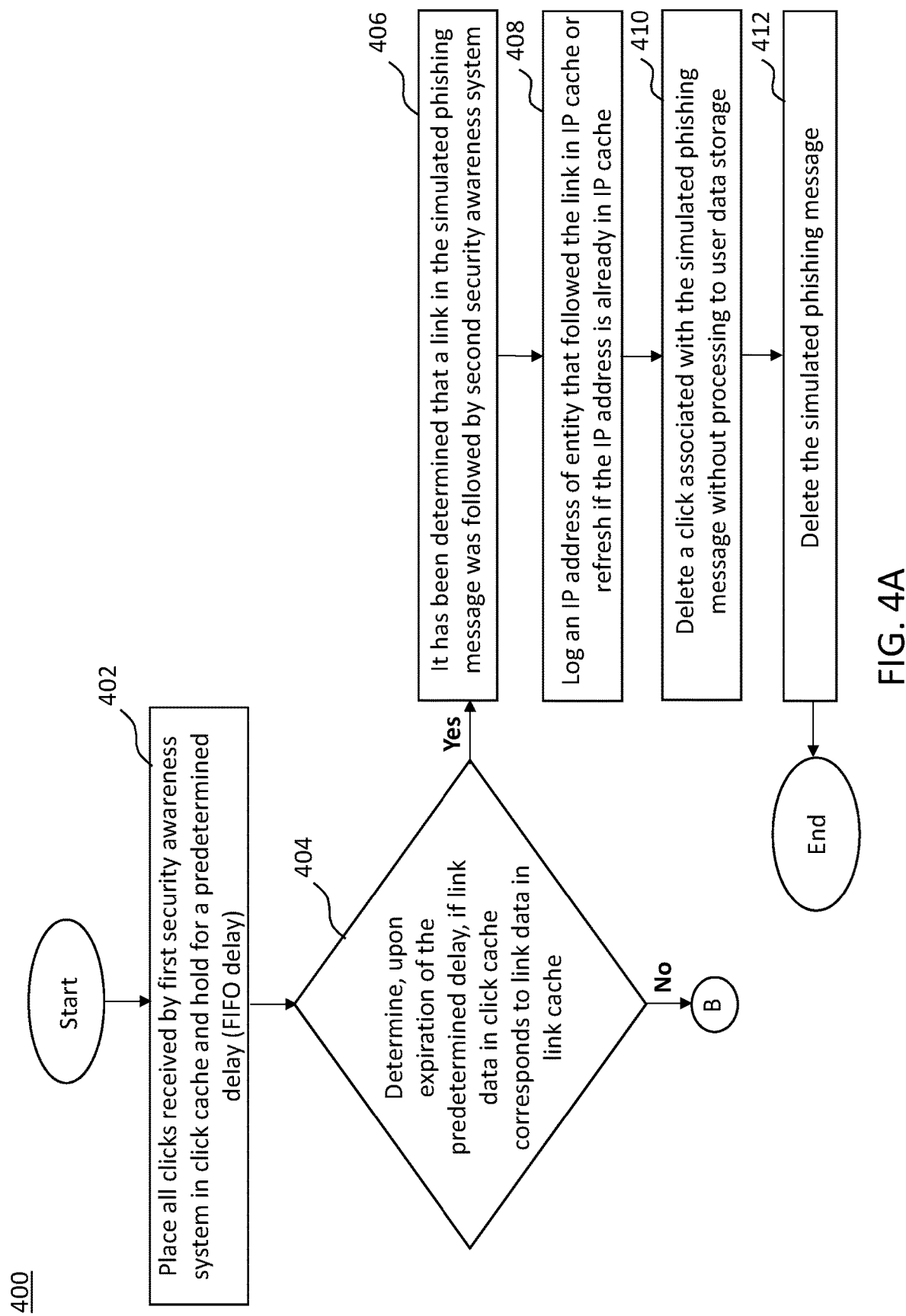
FIGS. 4A, 4B, and 4C depict a process for processing an interaction with a message to determine whether the interaction is initiated by a second security awareness system or a user, according to some embodiments.
Figure 4B:
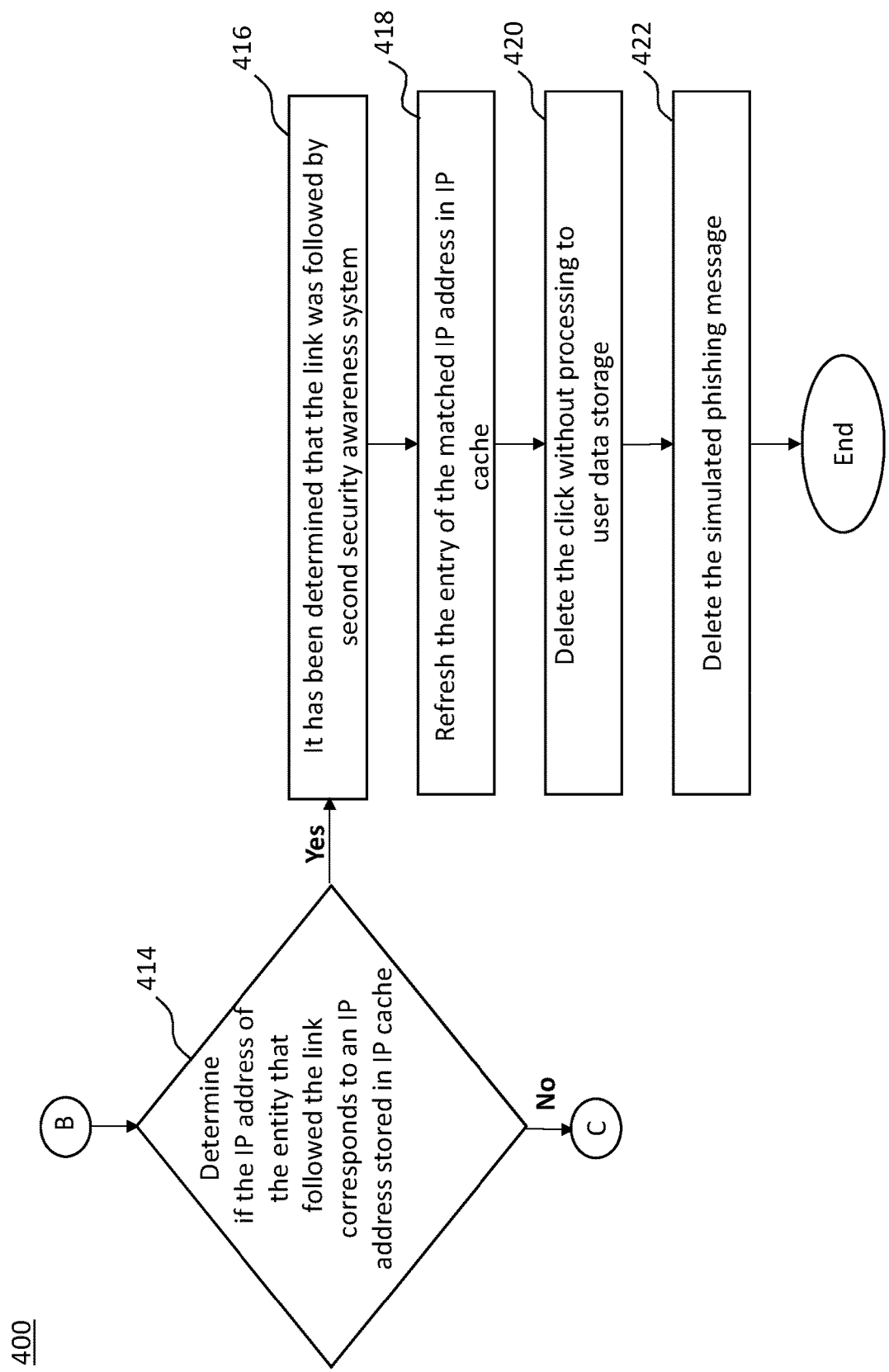
Figure 4C:
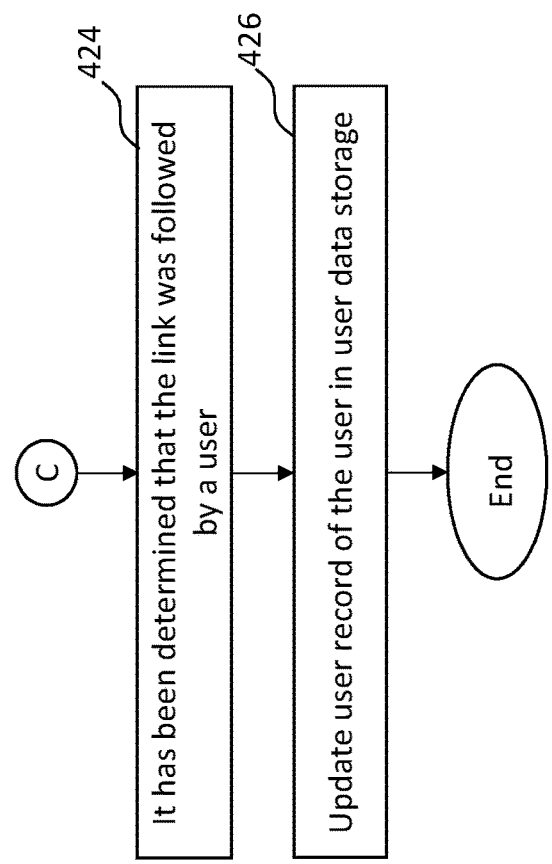

FIGS. 4A, 4B, and 4C depict process 400 for processing an interaction with a message to determine whether the interaction is initiated by a second security awareness system or a user, according to some embodiments.

According to an implementation, the processing commences at block 402, whereupon all clicks received by first security awareness system 202 are placed in click cache 228 and held for a predetermined delay. In an example, the clicks received by first security awareness system 202 may be held for a few seconds. According to an implementation, message determination unit 222 may place all the clicks in click cache 228 and hold the clicks for a predetermined delay. In an example, the clicks in click cache 228 are delayed by a FIFO block having a configurable (delay) value of $N_{click}$ seconds. For example, a click may be delayed by an amount of time in the range of seconds. After the delay is over, message determination unit 222 processes the clicks.

Process 400 then proceeds to block 404. At block 404, upon expiration of the predetermined delay, it is determined, for a reported simulated phishing message, whether link data in click cache 228 corresponds to link data in link cache 230. According to an implementation, message determination unit 222 may determine, for all messages processed by first threat detection platform 218, if that the link data in click cache 228 corresponds to the link data in link cache 230. As may be understood, the link data in click cache 228 includes information related to followed links. In an implementation, message determination unit 222 may compare the followed link data from click cache 228 with link data in link cache 230 to determine whether a link in the simulated phishing message was detonated by second security awareness system 204. If it is determined that the link data in click cache 228 corresponds to the link data in link cache 230, process 400 proceeds along a YES branch to block 406.

At block 406, it has been determined that a link in the simulated phishing message was followed by second security awareness system 204. In an implementation, in response to determining that the link data in click cache 228 corresponds to the link data in link cache 230, message determination unit 222 may determine that the link in the simulated phishing message was followed by second security awareness system 204. Thereafter, at block 408, an IP address of the entity that followed the link is logged in IP cache 232 or if the IP address is already present in IP cache 232, then the IP address in IP cache 232 is refreshed. According to an implementation, message determination unit 222 may log the IP address of the entity that followed the link in IP cache 232 if the IP address of the entity does not exist in IP cache 232. In some implementations, if the IP address of the entity already exists in IP cache 232, then message determination unit 222 may refresh the IP address in IP cache 232.

Further, at block 410, a click associated with the simulated phishing message is deleted without processing the click to user data storage 224. In an implementation, message determination unit 222 may delete the click associated with the simulated phishing message from click cache 228 without processing the click to user data storage 224. Then at block 412, the simulated phishing message is deleted. In an implementation, message determination unit 222 may delete the simulated phishing message.

If it is determined that the link data in click cache 228 does not correspond to the link data in link cache 230, process 400 proceeds along the NO branch to block 414. At block 414, it is determined if the IP address of the entity that followed the link corresponds to an IP address stored in IP cache 232. In an implementation, if there is no match to link data in link cache 230, then message determination unit 222 may check if the IP address of the entity that followed the link corresponds to an IP address stored in IP cache 232. If it is determined that the IP address of the entity that followed the link corresponds to an IP address stored in IP cache 232, process 400 proceeds along the YES branch to block 416. At block 416, it has been determined that the link in the simulated phishing message was followed by second security awareness system 204. According to an implementation, message determination unit 222 may determine that the link in the simulated phishing message was followed or detonated by second security awareness system 204.

Process 400 then proceeds to block 418. At block 418, the entry of the matched IP address in IP cache 232 is refreshed. In an implementation, message determination unit 222 may refresh the entry of the matched IP address in IP cache 232. In an example implementation, message determination unit 222 may implement a data expiration operation in IP cache 232, for example, using an LRU cache. In an implementation, through the data expiration operation, the age of the IP addresses in IP cache 232 is set to zero so that the IP addresses reside in IP cache 232 for longer. At block 420, a click associated with the simulated phishing message is deleted without processing the click to user data storage 224. In an implementation, message determination unit 222 may delete the click associated with the simulated phishing message from click cache 228 without processing the click to user data storage 224. Then at block 422, the simulated phishing message is deleted. In an implementation, message determination unit 222 may delete the simulated phishing message.

If it is determined that the IP address of the entity that followed the link does not correspond to the IP address stored in IP cache 232, process 400 proceeds along the NO branch to block 424. At block 424, it has been determined that the link simulated phishing message was followed by a user. In an implementation, message determination unit 222 may determine that the link simulated phishing message was followed by the user. At block 426, the user record of the user is updated in user data storage 224. According to an implementation, message determination unit 222 may update the user record of the user in user data storage 224 for further processing and process 400 is terminated.

According to one or more embodiments, IP cache 232 of IP addresses that are associated with second security awareness system 204 is a medium term cache, built and dynamically updated though process 400. In an implementation, first security awareness system 202 may be configured to subsequently recognize future detonations performed using IP addresses in IP cache 232 as not associated with a user. According to an implementation, process 400 to filter out false positives is built on a reasonable assumption that second security awareness system 204 may have a limited number of IP addresses at a time that it uses to detonate messages. When multiple messages are detonated including IP addresses, metadata such as a user for whom a simulated phishing message was intended, a first time the simulated phishing message was interacted with by a certain IP address, a last time the simulated phishing message was interacted with by a certain IP address, and how many times the simulated phishing message was interacted with by a certain IP address may be used in process 400 to determine the probability of the IP address belonging to second security awareness system 204.

In an embodiment, if detonation of the simulated phishing message by second security awareness system 204 occurs after first security awareness system 202 completes scanning of the simulated phishing message, then the click is never handled as though it was initiated by the user.

Although it has been described that the detonation of the reported message is performed by second security awareness system 204, in some implementations, the detonation of the reported message may be performed by first security awareness system 202, or by both first security awareness system 202 and second security awareness system 204. In an example implementation, simulated phishing messages generated by second security awareness system 204 may be reported to first security awareness system 202 by a user. In response to receiving the reported messages, first security awareness system 202 may detonate the reported messages to test them for maliciousness. Second security awareness system 204 may receive one or more indications from first security awareness system 202 that interactions have occurred with the reported messages (i.e., the simulated phishing messages). In response, second security awareness system 204 may process/analyze the reported messages to mitigate false positives.

Figure 5:
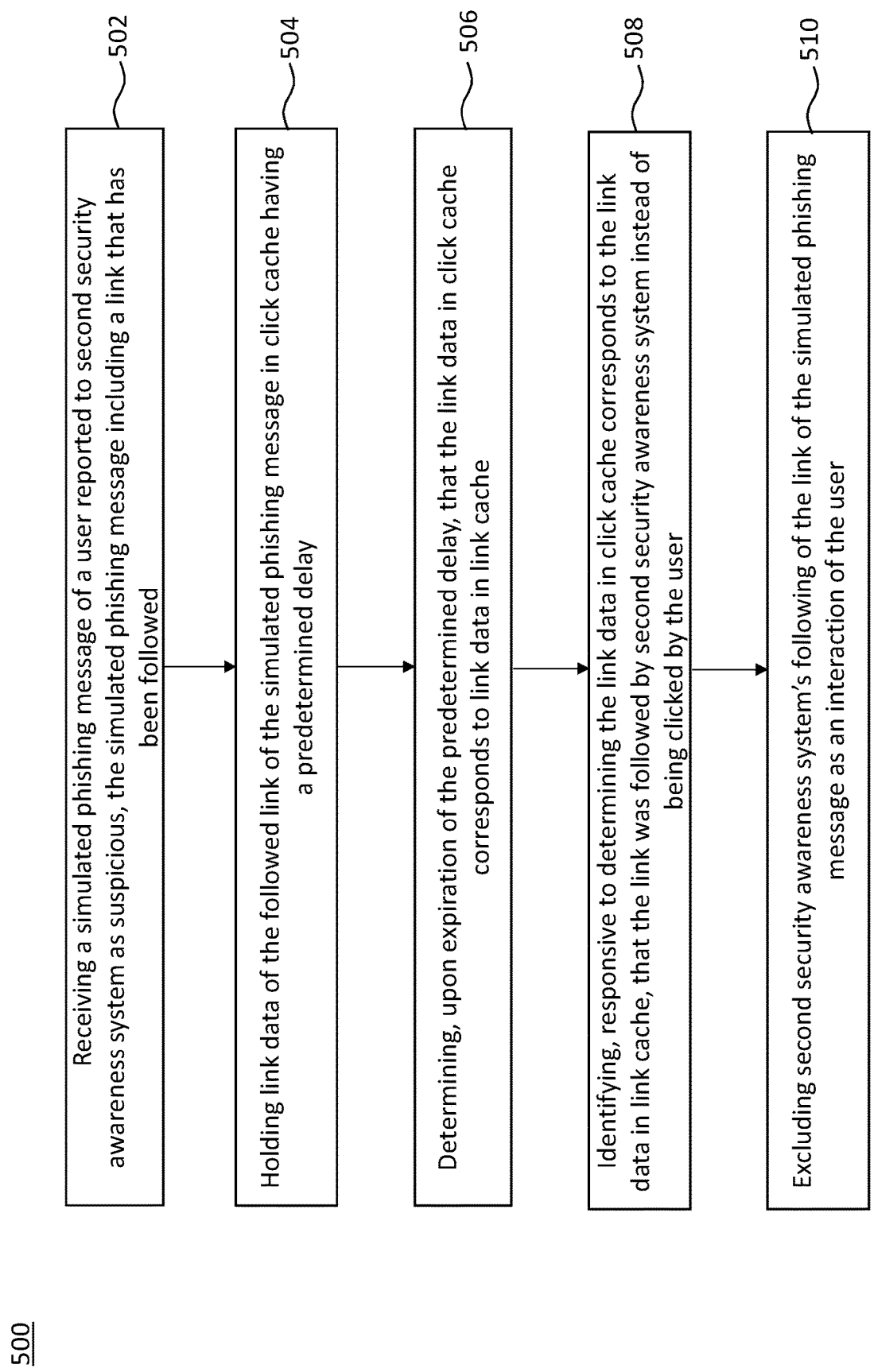
FIG. 5 depicts a flowchart for identifying whether an interaction with a simulated phishing message is initiated by a second security awareness system or a user, according to some embodiments.

FIG. 5 depicts flowchart 500 for identifying whether an interaction with a simulated phishing message is initiated by the second security awareness system or the user, according to some embodiments.

Step 502 includes receiving a simulated phishing message of a user reported to second security awareness system 204 as suspicious, where the simulated phishing message includes a link that has been followed. In an implementation, first security awareness system 202 may be configured to receive the simulated phishing message of the user reported to second security awareness system 204 as suspicious. According to an implementation, first security awareness system 202 may be configured to receive the message forwarded by second security awareness system 204. In some implementations, first security awareness system 202 may receive the message of second security awareness system 204 by one of monitoring or scanning second mailbox 240 within second security awareness system 204 for simulated phishing messages. In an implementation, first security awareness system 202 may store click data for the simulated phishing message and other messages to click cache 228.

Step 504 includes holding link data of the followed link of the simulated phishing message in click cache 228 having a predetermined delay. In an implementation, message determination unit 222 of first security awareness system 202 may be configured to hold the link data of the followed link of the simulated phishing message in click cache 228 having a predetermined delay. In an example, message determination unit 222 may be configured to hold the link data of the followed link of the simulated phishing message in click cache 228 for about thirty seconds.

Step 506 includes determining, upon expiration of the predetermined delay, that the link data in click cache 228 corresponds to link data in link cache 230. In an implementation, message determination unit 222 may determine that the link data in click cache 228 corresponds to the link data in link cache 230.

Step 508 includes identifying, responsive to determining the link data in click cache 228 corresponds to the link data in link cache 230, that the link was followed by second security awareness system 204 instead of being clicked by the user. In an implementation, message determination unit 222 may identify that the link was followed by second security awareness system 204 instead of being clicked by the user. In some implementations, message determination unit 222 may add to IP cache 232, the IP address of the entity that followed the link. In an example, IP cache 232 caches the IP address known to be associated with second security awareness system 204. In some implementations, the age of the IP data of the entity that follows the link is reset in IP cache 232.

Step 510 includes excluding second security awareness system 204's following of the link of the message as an interaction of the user. In an implementation, message determination unit 222 may exclude second security awareness system 204's following of the link of the message as an interaction of the user. According to an implementation, message determination unit 222 may disassociate, from a user record of the user, a click of the user for the followed link that was recorded for second security awareness system 204's following of the link of the message.

Figure 6:
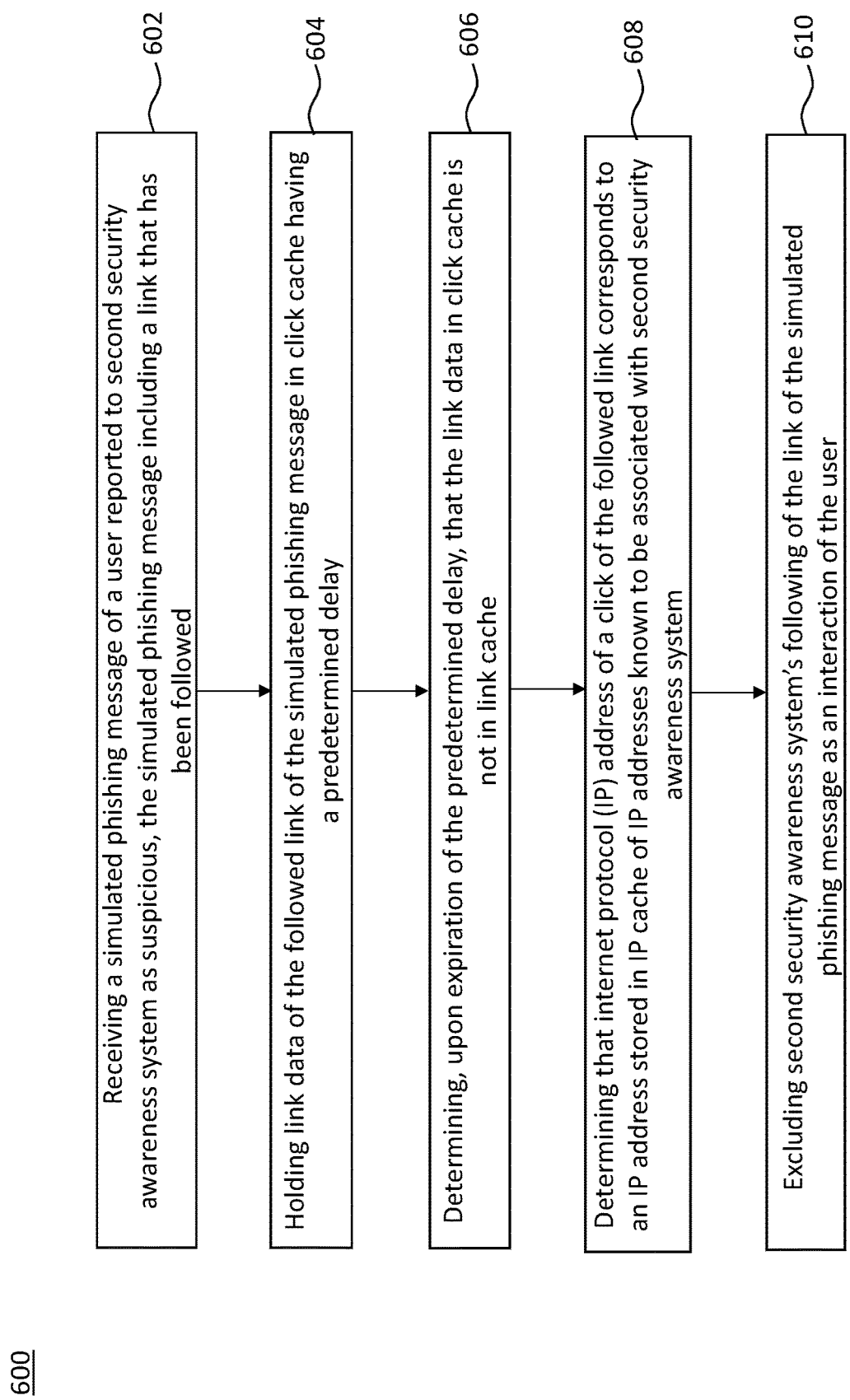
FIG. 6 depicts another flowchart for identifying whether an interaction with a simulated phishing message is initiated by a second security awareness system or a user, according to some embodiments.

FIG. 6 depicts flowchart 600 for identifying whether an interaction with a message is initiated by second security awareness system 204 or a user, according to some embodiments.

Step 602 includes receiving a message of a user reported to second security awareness system 204 as suspicious, where the message includes a link that has been followed. In an implementation, first security awareness system 202 may be configured to receive the message of the user reported to second security awareness system 204 as suspicious. According to an implementation, first security awareness system 202 may be configured to receive the message forwarded by second security awareness system 204. In some implementations, first security awareness system 202 may receive the message of second security awareness system 204 by one of monitoring or scanning second mailbox 240 within second security awareness system 204 for messages. In an implementation, first security awareness system 202 may store click data for the simulated phishing message and other messages to click cache 228.

Step 604 includes holding link data of the followed link of the message in click cache 228 having a predetermined delay. In an implementation, message determination unit 222 of first security awareness system 202 may be configured to hold the link data of the followed link of the message in click cache 228 having a predetermined delay. In an example, message determination unit 222 may be configured to hold the link data of the followed link of the message in click cache 228 for about thirty seconds.

Step 606 includes determining, upon expiration of the predetermined delay, that the link data in click cache 228 is not in link cache 230. In an implementation, message determination unit 222 may determine that the link data in click cache 228 is not in link cache 230.

Step 608 includes determining that an IP address of a click of the followed link corresponds to an IP address stored in IP cache 232 of IP addresses known to be associated with second security awareness system 204. In an implementation, message determination unit 222 may determine that the IP address of the entity that followed a link corresponds to the IP address stored in IP cache 232 of IP addresses known to be associated with second security awareness system 204. It is then identified that the link was followed by second security awareness system 204 instead of being clicked by the user.

According to one or more embodiments, in response to determining that the IP address of the click of the followed link corresponds to the IP address stored in IP cache 232 of IP addresses known to be associated with second security awareness system 204, message determination unit 222 may add the link data of the followed link to link cache 230 and may reset age of the IP data of an entity that follows the link in IP cache 232.

Step 610 excludes second security awareness system 204's following of the link of the simulated phishing message as an interaction of the user. In an implementation, message determination unit 222 may exclude second security awareness system 204's following of the link of the message as an interaction of the user. According to an implementation, message determination unit 222 may disassociate, from a user record of the user, a click of the user for the followed link that was recorded for second security awareness system 204's following of the link of the message.

Although it has been described that an action including interacting with a link or following of a link included in a reported message is referred to as a click, in some implementations, any type of interaction with the reported message that may happen may be referred to as a click. In an example, an action including opening an attachment included in the reported message may also be referred to as a click. Example of the attachment may include an executable file (.exe file) or a file having a macro. In another example, an action including opening the reported message itself may be referred to as a click.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
   receiving, by a first security awareness system, a simulated phishing message of a user reported to a second security awareness system as suspicious, the simulated phishing message comprising a link that has been followed;
   holding, by the first security awareness system, link data of the link of the simulated phishing message in a click cache having a predetermined delay;
   determining, by the first security awareness system upon expiration of the predetermined delay, that the link data in the click cache corresponds to link data in a link cache;
   identifying, by the first security awareness system responsive to determining the link data in the click cache corresponds to the link data in the link cache, that the link was followed by the second security awareness system instead of being clicked by the user; and
   excluding, by the first security awareness system, the second security awareness system's following of the link of the simulated phishing message as an interaction of the user.

2. The method of claim 1, further comprising disassociating, by the first security awareness system, from a user record of the user of the first security awareness system a click of the user for the link that was recorded for the second security awareness system's following of the link of the simulated phishing message.

3. The method of claim 1, further comprising receiving, by the first security awareness system, the simulated phishing message forwarded by the second security awareness system.

4. The method of claim 1, further comprising receiving, by the first security awareness system, the simulated phishing message of the second security awareness system by one of monitoring or scanning a mailbox within the second security awareness system for simulated phishing messages.

5. The method of claim 1, further comprising storing, by the first security awareness system, click data for the simulated phishing message to the click cache.

6. The method of claim 1, further comprising updating, by the first security awareness system, link data for the simulated phishing message to the link cache, wherein the link cache stores links that have a probability of being followed by the second security awareness system.

7. The method of claim 1, further comprising resetting age of the link in the link cache.

8. The method of claim 1, further comprising adding, by the first security awareness system, to an internet protocol (IP) cache, data comprising an IP address, wherein the IP cache stores IP addresses known to be associated with the second security awareness system.

9. The method of claim 8, further comprising resetting age of IP data of an entity that follows the link in the IP cache.

10. A method comprising:
receiving, by a first security awareness system, a simulated phishing message of a user reported to a second security awareness system as suspicious, the simulated phishing message comprising a link that has been followed;
holding, by the first security awareness system, link data of the link of the simulated phishing message in a click cache having a predetermined delay;
determining, by the first security awareness system upon expiration of the predetermined delay, that the link data in the click cache is not in a link cache;
determining, by the first security awareness system, that the internet protocol (IP) address of a click of the link corresponds to an IP address stored in an IP cache of IP addresses known to be associated with the second security awareness system;
identifying, by the first security awareness system, that the link was followed by the second security awareness system instead of being clicked by the user; and
excluding, by the first security awareness system, the second security awareness system's following of the link of the simulated phishing message as an interaction of the user.

11. The method of claim 10, further comprising disassociating, by the first security awareness system, from a user record of the user of the first security awareness system a click of the user for the link that was recorded for the second security awareness system's following of the link of the simulated phishing message.

12. The method of claim 10, further comprising receiving, by the first security awareness system, the simulated phishing message forwarded by the second security awareness system.

13. The method of claim 10, further comprising receiving, by the first security awareness system, the simulated phishing message of the second security awareness system by one of monitoring or scanning a mailbox within the second security awareness system for simulated phishing messages.

14. The method of claim 10, further comprising resetting age of IP data of an entity that follows the link in the IP cache.

15. The method of claim 10, further comprising resetting age of the link in the link cache.

16. A system comprising:
a memory;
a first security awareness system executable on one or more processors, coupled to the memory and configured to:
receive a simulated phishing message of a user reported to a second security awareness system as suspicious, the simulated phishing message comprising a link that has been followed;
hold, link data of the link of the simulated phishing message in a click cache having a predetermined delay;
determine, upon expiration of the predetermined delay, that the link was followed by the second security awareness system instead of being clicked by the user responsive to identifying that the link data in the click cache corresponds to link data in a link cache or an internet protocol (IP) address of a click of the link corresponds to an IP address stored in an IP cache of IP addresses known to be associated with the second security awareness system; and
exclude, responsive to the determination, the second security awareness system's following of the link of the simulated phishing message as an interaction of the user.

17. The system of claim 16, wherein the first security awareness system is further configured to dissociate from a user record of the user of the first security awareness system a click of the user for the link that was recorded for the second security awareness system's following of the link of the simulated phishing message.

18. The system of claim 16, wherein the first security awareness system is further configured to receive the simulated phishing message forwarded by the second security awareness system.

19. The system of claim 16, wherein the first security awareness system is further configured to receive the simulated phishing message of the second security awareness system by one of monitoring or scanning a mailbox within the second security awareness system for simulated phishing messages.

20. The system of claim 16, wherein the first security awareness system is further configured to refresh an entry of IP data and link address of the link in the IP cache and the link cache.

* * * * *